Feb. 14, 1967 K. Y. JABBAR 3,304,374
INDICATING CIRCUIT
Filed Oct. 2, 1964
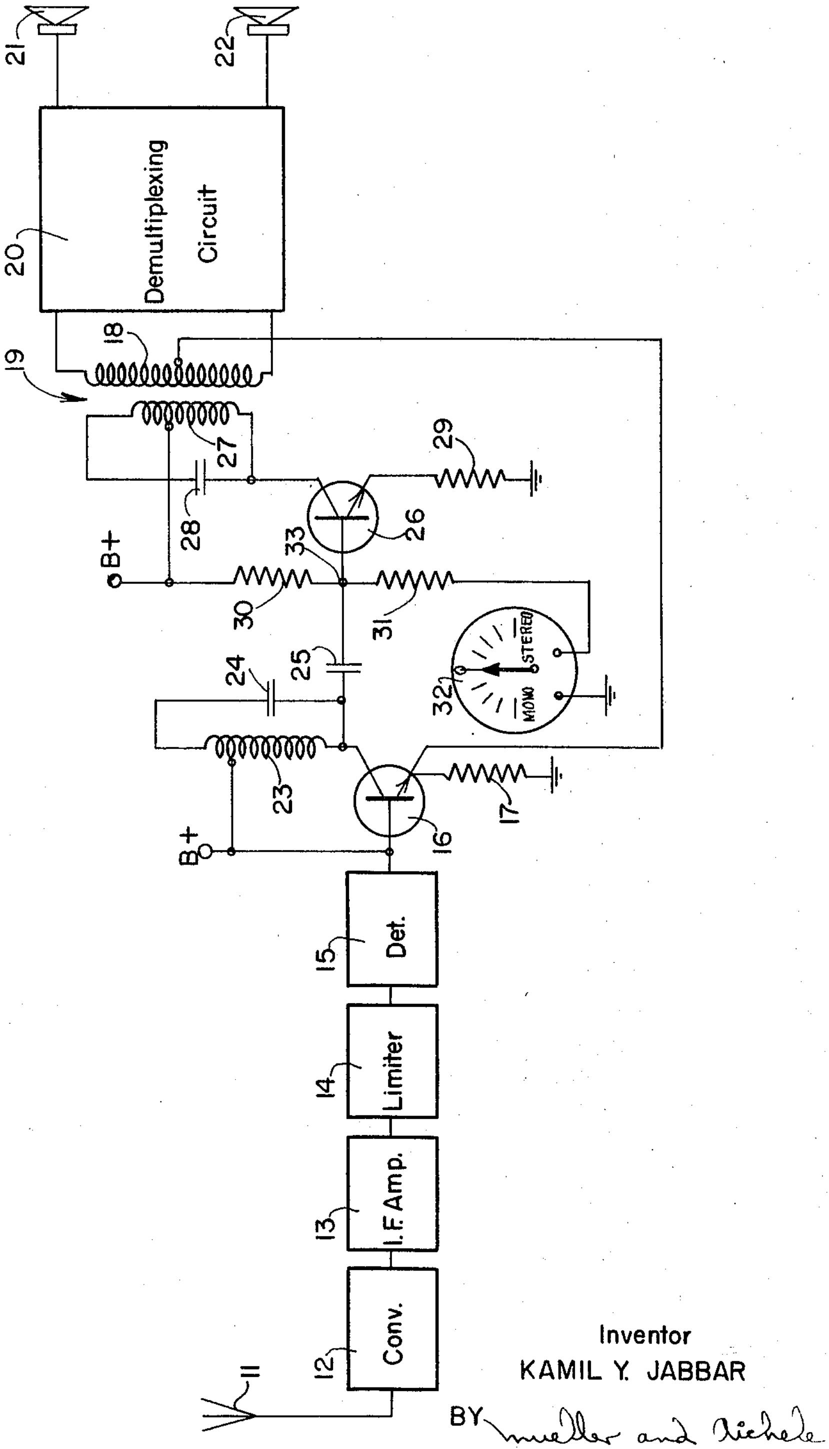
Inventor
KAMIL Y. JABBAR
BY Mueller and Aichele
Attys.

3,304,374
Patented Feb. 14, 1967

3,304,374

INDICATING CIRCUIT

Kamil Y. Jabbar, Chicago, Ill., assignor to Motorola, Inc., Franklin Park, Ill., a corporation of Illinois Filed Oct. 2, 1964, Ser. No. 401,196
5 Claims. (Cl. 179—15)

This invention relates to frequency modulation receivers, and more particularly to a system for indicating the respective presence of monaural and stereo signals in a frequency modulation receiver and for indicating the strength of stereo signals when such signals are being received.

In many frequency modulation receivers providing both monaural and stereo reception, an indicator is used to inform the listener whether monaural (non-multiplex) signals or stereophonic (multiplex) signals are being received. Some indicator systems incorporate a light indicator, such as a neon lamp, which is energized in the presence of multiplex signals. Other systems utilize a meter movement as an indicator of the presence of multiplex signals. In the latter case, the indicator of the meter may move a longer distance in the presence of multiplex signals than in the presence of non-multiplex signals, such movement thereby providing a relative indication.

In both of the above types of systems, an independent amplifying stage is usually necessary, especially where transistor circuitry is present in the receiver. Such a stage utilizes either the 19 kc. multiplex pilot signals or the 38 kc. restored subcarrier signals, either of which is available in the circuit whenever a multiplex signal is being received, to drive the indicator. In addition, such systems are also dependent upon circuit components such as tuned circuits which are utilized for other purposes in the system and consequently, may affect the parameters of the receiver circuitry.

An object of the invention is to provide an improved low cost system for indicating the respective presence of stereo (multiplex) and monaural (non-multiplex) signals for use with a frequency modulation receiver.

It is another object of the invention to provide an improved system for indicating the respective presence of multiplex and non-multiplex signal in a frequency modulation receiver, and for indicating the strength of the multiplex signals when such signals are being received to thereby provide tuning indication.

Still another object of the invention is to provide an indicator system for a frequency modulation multiplex receiver, which system utilizes a minimum number of components and which does not affect the circuit parameters of the receiver.

A feature of the invention is the provision of a meter connected between a reference potential and a bias circuit for the control electrode of an amplifier which operates during multiplex reception as a class C amplifier to amplify unmodulated pilot carrier signals, and to reverse the potential at the control electrode with respect to the reference potential.

Another feature of the invention is the provision of a meter connected between a reference potential and a bias circuit for the base of a transistor which operates during multiplex reception as a class C amplifier to amplify unmodulated pilot carrier signals, and to reverse the potential at the base electrode with respect to the reference potential.

The single figure of the drawing is a schematic diagram of a frequency modulation multiplex receiver having an indicator system constructed in accordance with the invention.

The system of the invention indicates the respective presence of multiplex and non-multiplex signals in a frequency modulation monaural and stereophonic receiver, and also indicates the strength of multiplex signals when such signals are being received, to thereby provide a tuning indication. The system includes tuned circuitry for selecting the pilot signal upon reception of multiplex signals and further includes an amplifier connected to the tuned circuitry for amplifying the pilot signal. The amplifier has a control electrode with a bias circuit connected to the control electrode and providing a D.C. bias thereat to hold the amplifier just below the threshold of conduction in the absence of pilot signals. A zero center meter is series connected between the control electrode and a reference potential and deflects in a predetermined direction from its center in the absence of pilot signals due to current flow in a given direction between the control electrode and the reference potential. In the presence of multiplex signals the amplifier operates in class C fashion to amplify the pilot signals. The potential at the control electrode reverses with respect to the reference potential to cause current flow through the meter between the base electrode and the reference potential in a direction opposite to the given direction. The meter thereby deflects in a direction opposite to the predetermined direction an amount proportional to the average potential on the control electrode due to the conduction of the amplifier.

Referring now more particularly to the drawing, a schematic diagram of a frequency modulation multiplex receiver is shown. Frequency modulation signals received by antenna 11 are applied to converter 12 and amplified in intermediate frequency amplifier 13. The amplified signals are then limited in limiter 14 and de-modulated in detector 15.

Circuitry which includes an indicator system in accordance with the invention is connected to the output of detector 15. This circuitry includes transistor 16, the base of which is connected to detector 15. Signals applied to the base of transistor 16 are developed across resistor 17 and are coupled to the center tap of the secondary winding 18 of coupling transformer 19. When non-multiplex signals are received, transistor 16 amplifies the signals and applies them to winding 18, which is connected to the multiplex circuit 20. The multiplex circuit 20 is of the switching demodulator type well known in the art. An example of such a circuit is shown in the magazine, Electronics World, January 1962, in an article by Norman H. Crowhurst, entitled, "FM Multiplex Stereo Detection Methods." The multiplexing circuit 20 passes the non-multiplex audio signals developed across resistor 17 to speakers 21 and 22 for reproduction.

As is well known in the art, multiplex signals to be reproduced as stereophonic or binaural sound involve a right channel plus left channel composite signal, a right channel minus left channel composite signal and, a 19 kc. carrier signal which is used as to restore the suppressed carrier in proper phase for demultiplexing the composite signals and producing the right and left channel outputs. Accordingly, the collector of transistor 16 is connected to a 19 kc. filter including coil 23 and capacitor 24. In the presence of multiplex signals, the 19 kc. pilot is selected by this filter and passed through coupling capacitor 25 to the base of a transistor 26. Transistor 26 amplifies the 19 kc. pilot signal and its associated harmonics. The collector of transistor 26 is coupled to a tuned circuit comprised of the primary winding 27 of transformer 19 and capacitor 28. Winding 27 and capacitor 28 are tuned to the second harmonic or 38 kc. frequency which is the frequency of the suppressed carrier and accordingly, such supressed carrier is restored in proper phase and applied to demultiplexing circuit 20.

Transistor 26 is biased by emitter resistor 29 and a base resistor 30, which is connected to the source of B+ potential. The bias circuit for transistor 26 is completed by a resistor 31 and a zero center meter 32 connected in series in stated order from the base electrode of transistor 26 to the reference potential or ground. Resistors 29, 30 and 31 are selected to bias transistor 26 to a point just below the threshold of conduction.

Meter 32 provides an indication to the listener of the respective presence of multiplex and non-multiplex signals in the receiver. Thus, with the receiver turned off and the source of B+ potential removed, the meter will indicate zero as shown in the drawing. Upon the application of B+ potential but in the absence of multiplex signals, current will flow between the base connection point 33 and the reference potential, deflecting the meter 32 counter clockwise to indicate non-multiplex signals. However, in the presence of multiplex signals the 19 kc. filter formed by capacitor 24 and winding 23 applies unmodulated 19 kc. pilot carrier through capacitor 25 to the base of transistor 26. Transistor 26 then operates to amplify the 19 kc. signal and its associated harmonics. The 38 kc. harmonic of this signal is then detected in the tuned circuit comprised of winding 27 and capacitor 28. It will be noted that transistor 26 operates as a class C amplifier and will be conductive during the positive portion of the cycle and hence will effectively clip the positive voltage at point 33. On the other hand, transistor 26 will be biased to non-conduction during the negative half cycles of the signal being amplified. As a result, the average potential at point 33 drops to a negative potential, lowering point 33 below that of the reference ground. Current flow through meter 32 will thereby be reversed in direction due to the reversal of potential at point 33 and accordingly the meter will deflect clockwise toward the stereo mark. The strength of the signal at point 33 will determine the extent of the deflection and enables the listener to tune the receiver until this displacement is maximized to thereby indicate optimum tuning.

The system discussed herein is simpler and more reliable than previous attempts at providing multiplex and non-multiplex indication. The nature of the indication, that is a meter movement, is clearly observable. The system utilizes a minimum number of components and is independent of circuit parameters for the remainder of the receiver. The system also provides a turning indicator in addition to an indicator for indicating the presence or absence of multiplex signals. The fact that the meter requires a very low voltage makes it advantageous for use in transistor circuitry. A practical operating circuit in accordance with the invention has been constructed utilizing components of the following values:

| | |
|---|---|
| Capacitor **24** ---------- $\mu\mu$f-- | 1800 |
| Resistor **17** ---------- | 1.8K |
| Capacitor **25** ---------- $\mu$f-- | .001 |
| Resistor **30** ---------- megohoms-- | 1 |
| Resistor **31** ---------- | 100K |
| Capacitor **28** ---------- $\mu\mu$f-- | 680 |
| Resistor **29** ---------- ohms-- | 150 |

What is claimed is:

1. A system for indicating the respective presence of multiplex and non-multiplex signals in a frequency modulation receiver, such system including in combination, amplifier means including a bias circuit having a control point, said circuit providing at said control point in the presence of non-multiplex signals, a voltage of a given polarity with respect to a reference potential, said circuit providing at said control point in the presence of multiplex signals, a potential of polarity opposite to said given polarity, and meter means connected from said control point to the reference potential and providing opposite indications in response to said opposite polarities at said control point to thereby indicate the presence of multiplex and non-multiplex signals.

2. A system for indicating the respective presence of multiplex and non-multiplex signals in a frequency modulation receiver and for indicating the strength of multiplex signals when such signals are being received, such system including in combination, tuned circuit means for selecting the pilot signals upon reception of multiplex signals, amplifier means connected to said tuned circuit means for amplifying the pilot signals and including a bias circuit having a control point therein, said control point having a given voltage with respect to a reference potential in the absence of pilot signals amplified by said amplifier means and having a potential of a polarity opposite said given polarity in the presence of pilot signals, and a zero center meter series connected between said point and the reference potential, said meter deflecting in a predetermined direction from its center in the absence of pilot signals, and deflecting in the opposite direction in the presence of pilot signals a distance proportional to the magnitude of such pilot signals.

3. A system for indicating the respective presence of multiplex and non-multiplex signals in a frequency modulation receiver and for indicating the strength of multiplex signals when such signals are being received, such system including in combination, tuned circuit means for selecting the pilot signals upon reception of multiplex signals, amplifier means connected to said tuned circuit means for amplifying the pilot signals, said amplifier means having a control electrode for controlling the conduction thereof, and a bias circuit connected to said control electrode of said amplifier means and biasing said amplifier means at the threshold of conduction in the absence of pilot signals applied to said control electrode from said tuned circuit means, said bias circuit including a zero center meter series connected between said control electrode of said amplifier means and a reference potential, said meter deflecting in a predetermined direction from its center in the absence of signals from said tuned circuit means due to current flow in a given direction between said control electrode and the reference potential, said amplifier means operating in class C fashion to amplify the pilot signal upon reception of multiplex signals, said control electrode thereby changing potential to cause current flow through said meter between said control electrode and the reference potential in a direction opposite said given direction, said meter thereby deflecting in a direction opposite to said predetermined direction an amount proportional to the change of potential on said control electrode due to the conduction of said amplifier means.

4. A system for indicating the respective presence of multiplex and non-multiplex signals in a frequency modulation receiver and for indicating the strength of multiplex signals when such signals are being received, including in combination, tuned circuit means for selecting the pilot signals upon reception of multiplex signals, a transistor connected to said tuned circuit means for amplifying the pilot signals, said transistor having a base electrode for controlling the conduction thereof, and a bias circuit connected to said base electrode of said transistor and biasing said transistor at the threshold of conduction in the absence of the pilot signal, said bias circuit including a zero center meter series connected between said base electrode of said transistor and a reference potential, said meter deflecting in a predetermined direction from its center in the absence of the pilot signals due to current flow in a given direction between said base electrode and the reference potential, said transistor conducting in class C fashion to amplify the pilot signals upon reception of multiplex signals, said base electrode thereby changing potential to cause current flow through said meter between said base electrode and the reference potential in a direction opposite said given direction, said meter thereby deflecting in a direction opposite said predetermined direction an amount proportional to the change of potential on said base electrode due to conduction of said transistor.

5. A system for indicating the respective presence of multiplex and non-multiplex signals in a frequency modulation receiver, and for indicating the strength of multiplex signals when such signals are being received, including in combination, first tuned circuit means for selecting the pilot signals upon reception of multiplex signals, a transistor having base, emitter and collector regions, said base region having an electrode connected to said first tuned circuit means for amplifying the pilot signals, first resistance means connecting the emitter region of said transistor to a reference potential, second tuned circuit means for selecting the sub-carrier frequency of the multiplex signals connected to the collector region of said transistor, second resistance means for connecting the base electrode to a source of potential, a zero center meter connected to a reference potential, third resistance means connecting said zero center meter to the base electrode to complete a bias current path through said second and third resistance means and said meter from the source of potential, said first, second and third resistance means being of a value to bias said transistor just below the threshold of conduction, said transistor conducting in class C fashion when multiplex signals are received to amplify pilot signals from said first tuned circuit means to cause the potential between said first and third resistance means to reverse in polarity and vary in accordance with the strength of the pilot signals, whereby said meter will deflect in a first direction in the absence of pilot signals and in the opposite direction in the presence thereof a distance proportional to the strength thereof.

No references cited.

DAVID G. REDINBAUGH, *Primary Examiner.*

ROBERT L. GRIFFIN, *Examiner.*